US007631749B2

(12) United States Patent
Somasundaram et al.

(10) Patent No.: US 7,631,749 B2
(45) Date of Patent: Dec. 15, 2009

(54) TABLE DRIVE SYSTEM

(75) Inventors: Baskar Somasundaram, Bangalore (IN); Bernard Bouvier, Buc (FR); Shaji Alakkat, Bangalore (IN); Mukund Parthasarathy, Bangalore (IN)

(73) Assignee: General Electric Co., Schenectady, NY (US)

( * ) Notice: Subject to any disclaimer, the term of this patent is extended or adjusted under 35 U.S.C. 154(b) by 348 days.

(21) Appl. No.: 11/671,841

(22) Filed: Feb. 6, 2007

(65) Prior Publication Data

US 2008/0184487 A1 Aug. 7, 2008

(51) Int. Cl.
*B65G 47/34* (2006.01)

(52) U.S. Cl. ............................ 198/468.9; 5/601; 5/611

(58) Field of Classification Search ............. 198/468.6, 198/468.8, 468.9; 5/600, 601, 611
See application file for complete search history.

(56) References Cited

U.S. PATENT DOCUMENTS 4,475,072 A * 10/1984 Schwehr et al. ................ 5/601
5,107,121 A 4/1992 Lim et al.
5,590,429 A 1/1997 Boomgaarden et al.
5,636,394 A 6/1997 Bartley
5,659,909 A 8/1997 Pfeuffer et al.
5,782,869 A 7/1998 Berdut
6,615,428 B1 9/2003 Pattee
6,986,179 B2 * 1/2006 Varadharajulu et al. ........ 5/611
7,103,931 B2 * 9/2006 Somasundaram et al. ...... 5/601
7,367,273 B2 * 5/2008 Shinoda ...................... 108/143
7,430,772 B2 * 10/2008 Van Es .......................... 5/601
2003/0221871 A1 12/2003 Hamilton et al.
2004/0172758 A1 * 9/2004 Alakkat ......................... 5/600

OTHER PUBLICATIONS http://energized.esiemenshealthcare.com/urologynews/pdf/Litho_Multi_e.pdf.
http://www.quantummedical.net/qv-800.html.
http://www.osiosi.com/pdf/12_16_6864.pdf.
http://www.natco-razi.com.ye/dornier-uro-Lithotripters.htm#Compact%20Delta%20®.
http://www.stephanix.com/gb/tele_evoeplus.php.
http://www.biodex.com/imaging/c_arm/c_arm_810.htm.

* cited by examiner

*Primary Examiner*—James R Bidwell

(57) ABSTRACT

A table drive system for driving a support table is disclosed herein. The table drive system comprises at least one of a first drive assembly or a second drive assembly or a combination thereof. The first drive assembly is configured for moving the support table in a first direction for example, a longitudinal direction and the second drive assembly is configured for moving the support table in a second direction for example, a vertical direction. The table drive system further includes a safety block in combination with at least one of the first drive assembly or the second drive assembly, the safety block configured to arrest the motion of the first drive assembly or the second drive assembly upon experiencing a predetermined condition such as the failure of at least one of the first drive assembly or the second drive assembly.

21 Claims, 7 Drawing Sheets

FIG. 3
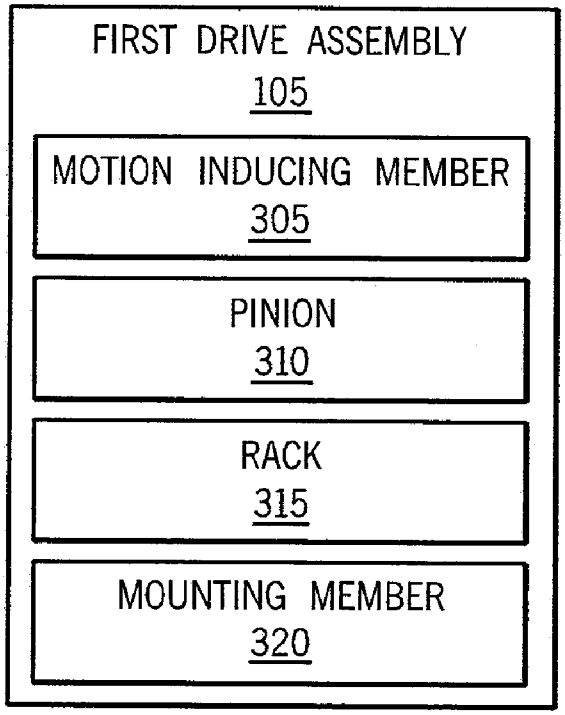
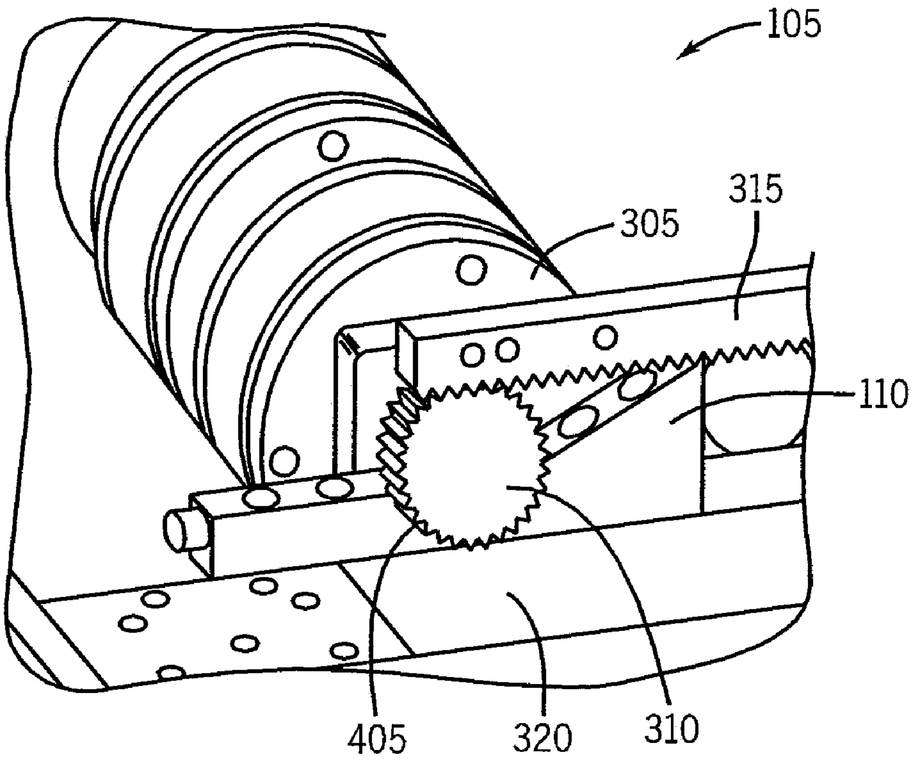
FIG. 4

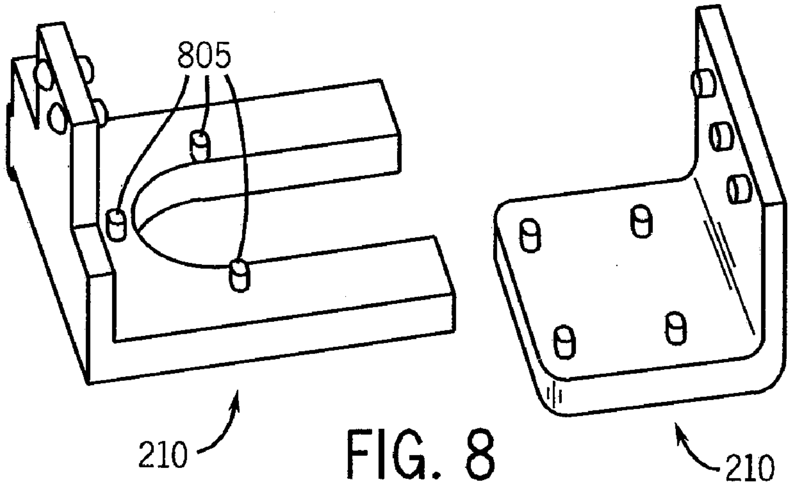
FIG. 8
FIG. 9
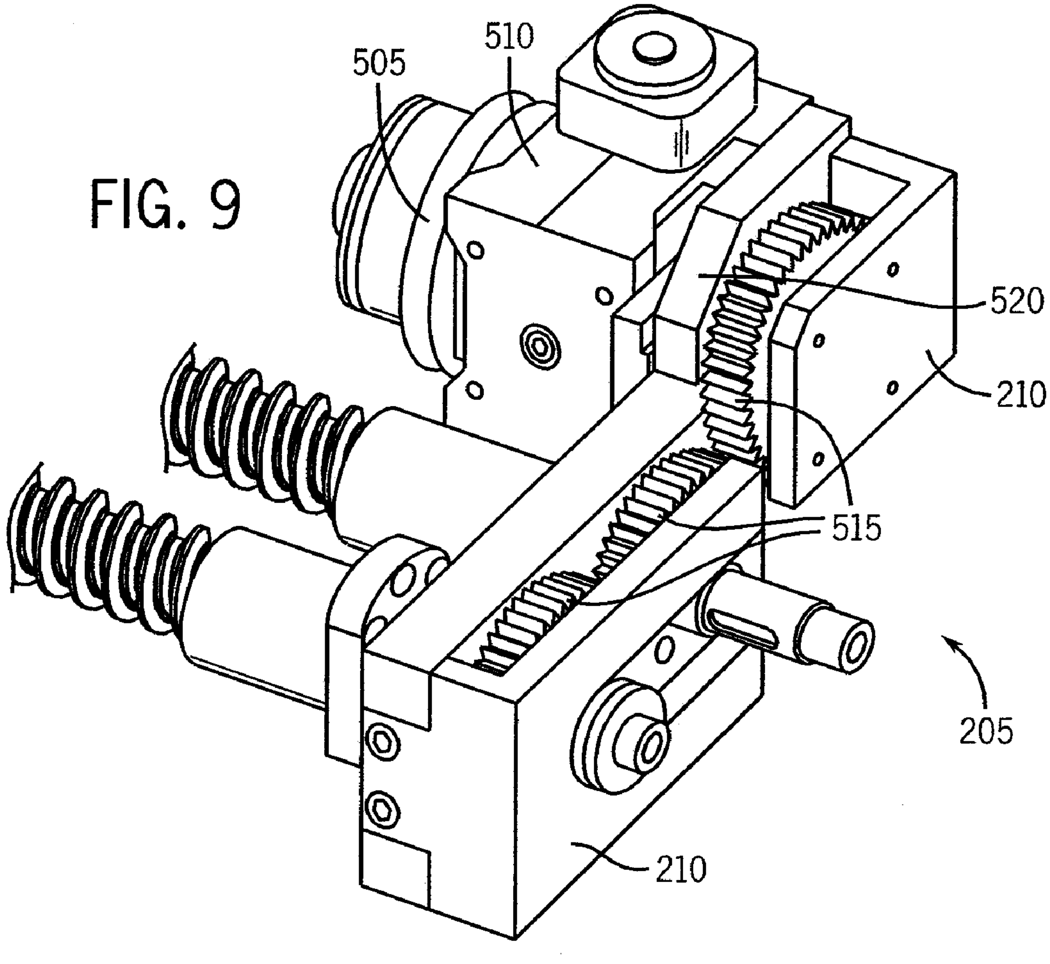

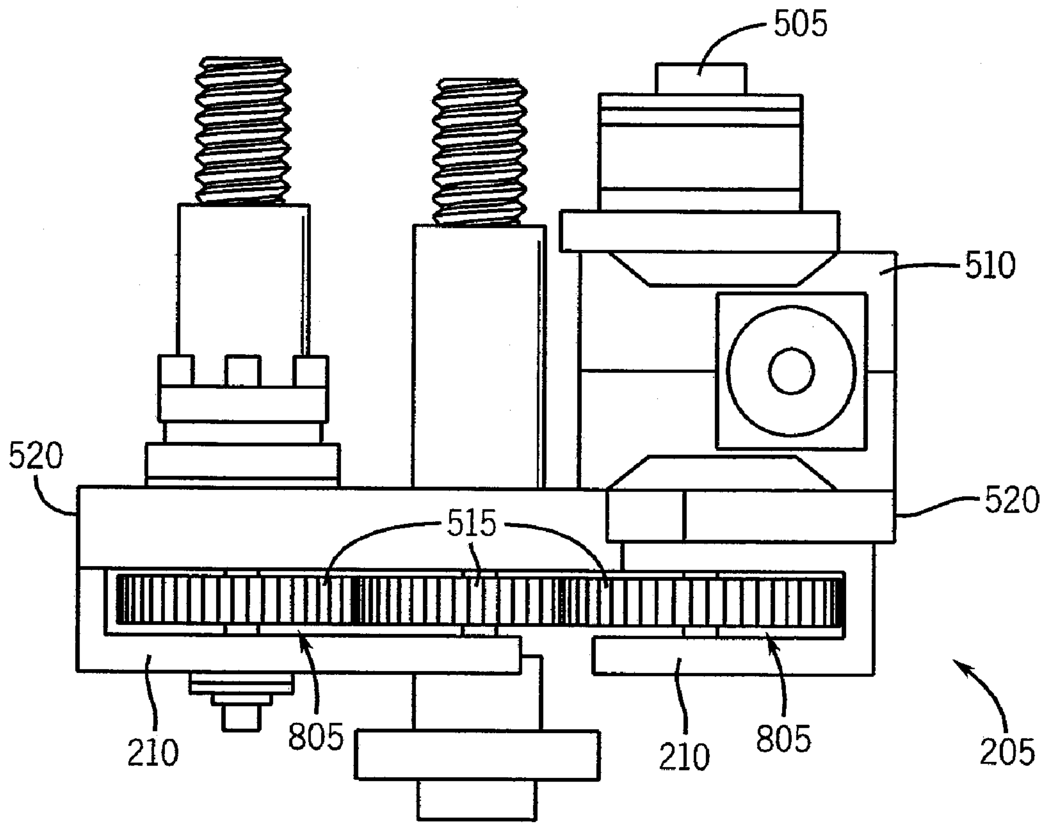
FIG. 10
FIG. 11
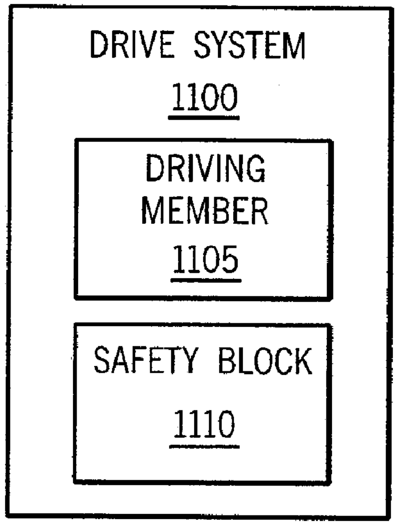

TABLE DRIVE SYSTEM

FIELD OF INVENTION

This invention relates generally to a table drive system and more particularly to a drive system for a patient positioning system.

BACKGROUND OF THE INVENTION

Generally, patient positioning systems are used to support and position patients during diagnostic or therapeutic medical procedures. Conventional patient positioning systems typically comprise a table assembly and a drive assembly coupled to the table assembly and configured to position a patient supported by the table assembly.

The table assembly includes a patient support table, on which the patient undergoing the medical procedure lies. Typically, the drive assembly configured for driving the table assembly includes actuator assemblies for effecting longitudinal, lateral and/or vertical movement of the patient support table for enabling convenient positioning of the patient.

The drive assembly can include a linear-type drive assembly, for example, a rack and pinion drive assembly comprising a motion-inducing member, a pinion coupled to the motion-inducing member, and a rack movably coupled to the pinion. The motion-inducing member can comprise one of a manually operable configuration or a drive motor with a drive shaft coupled directly to the pinion to drive the pinion. The rack is then driven by the motion-inducing member via the pinion.

One limitation associated with the rack and pinion drive assembly is the possibility of an uncontrolled motion of the rack resulting from a single point failure of the pinion. The uncontrolled motion of the rack may result in a patient fall during longitudinal and/or lateral movement of the patient support table. In a tilted condition of the patient support table, when one of the pinion or the drive shaft connecting the motion-inducing member to the pinion gets cut, the rack may move down due to gravity along with the patient and collide with the surrounding environment causing injury to the patient or medical staff operating the patient positioning system and/or may cause damage to the patient support table or other equipment proximate to the patient support table.

Some existing patient positioning systems employ a safety device comprising a fail-safe brake. However, such brakes may not be able to control the motion of the patient support table resulting from the failure of the rack and pinion drive assembly. Moreover, the presence of a redundant second fail-safe brake in a parallel axis reduces a longitudinal stroke required for carrying out the medical procedures. Thus, the overall size of the drive assembly increases thereby increasing the system complexity.

Further, various other prior art safety devices do not address the single point failure of the pinion in the rack and pinion drive assembly. Addressing the single point failure of the pinion in the rack and pinion drive assembly may enhance patient safety. Hence there exists a need for a compact drive assembly providing an enhanced patient safety while maintaining the longitudinal stroke available for the medical procedure.

Some patient positioning systems also provide for vertical patient movement. A drive assembly for effecting a vertical movement of the patient positioning system, for example, a gear train drive assembly comprises a motion-inducing member coupled to a gear train by a gearbox. The motion-inducing member includes a drive motor that drives the gear train to enable a telescopic lift mechanism in the patient positioning system.

Further, the gear train drive assembly may comprise a ball screw comprising multiple stages driven by the gear train. The gear train comprises multiple gears and each stage of the ball screw is driven through a corresponding gear. One limitation associated with the gear train drive assembly is the possibility of a gear detachment. Upon encountering the gear detachment, the gear train drive assembly may collapse thereby initiating a downfall of the patient support table along the vertical axis.

The downfall of the patient support table may result in injuries to one or more of the patient and/or the medical staff operating the patient positioning system. Further, the downfall of the patient support table may cause damage to the surrounding environment including systems positioned at close proximity to the patient positioning system.

Known safety devices for patient positioning systems, providing for vertical patient movement comprise a non-reversible gearbox and a fail-safe brake. However, such safety devices may not be able to prevent the downfall of the patient support table in case of gear detachment.

On the other hand, as in one of the solutions provided in the art, adding a fail-safe brake on each stage of the ball screw may increase the minimum height of the table assembly. The increment in the minimum height of the table assembly may pose difficulties in loading or unloading the patient on the patient support table.

Hence, there exists a need to provide a mechanism to prevent the collapsing of the gear train drive assembly in case of a gear detachment, while maintaining the minimum table height associated with easy patient loading or unloading.

All in all, there exists a need to provide a patient positioning system comprising a simpler, compact and robust mechanism for displacing the table assembly longitudinally, laterally and/or vertically while providing an easy access and increased safety to the patient and operator facility thereby enhancing reliability and cost savings.

BRIEF DESCRIPTION OF THE INVENTION

The above-mentioned shortcomings, disadvantages and problems are addressed herein which will be understood by reading and understanding the following specification.

In one embodiment, a table drive system for driving a support table is provided. The table drive system comprises at least one of a first drive assembly or a second drive assembly or a combination thereof. The first drive assembly is configured for moving the support table in a first direction for example, a longitudinal direction and the second drive assembly is configured for moving the support table in a second direction for example, a vertical direction. The table drive system further includes a safety block in combination with at least one of the first drive assembly or the second drive assembly, the safety block being configured to arrest the motion of the first drive assembly or the second drive assembly upon experiencing a predetermined condition. In various embodiments, the predetermined condition can comprise failure of at least one of the first drive assembly or the second drive assembly.

In another embodiment, a drive system for a patient positioning system is provided. The drive system comprises at least one driving member configured for moving a patient support table and a safety block in combination with the at least one driving member. The safety block is configured to arrest the motion of the driving member upon experiencing a predetermined condition. In various embodiments, the driving member comprises at least one of a rack and pinion drive assembly and a gear train drive assembly, and the predetermined condition is a failure of at least one of the rack and pinion drive assembly and the gear train drive assembly.

In yet another embodiment, a patient positioning system comprising a patient support table and a mounting member coupled to the patient support table is provided. The mounting member is configured to support at least one of a first drive assembly adapted for moving the patient support table in a first direction, and a second drive assembly adapted for moving the patient support sable in a second direction. Further, the patient positioning system includes a safety block in combination with at least one of the first drive assembly or the second drive assembly. The safety block is configured to arrest the motion of the first drive assembly or the second drive assembly upon experiencing a predetermined condition. In various embodiments, the predetermined condition comprises failure of at least one of the first drive assembly or the second drive assembly.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIG. 3 shows a block diagram of a first drive assembly in an embodiment of the invention;

FIG. 4 shows a schematic diagram of the first drive assembly in an embodiment of the invention;

FIG. 8 shows a schematic diagram of a safety block in an embodiment of the invention;

FIG. 9 shows a schematic diagram of the second drive assembly in another embodiment of the invention;

FIG. 10 shows a schematic diagram of a cross section of the second drive assembly shown at FIG. 9 in an embodiment of the invention;

FIG. 11 shows a block diagram of a drive system in an embodiment of the invention;

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
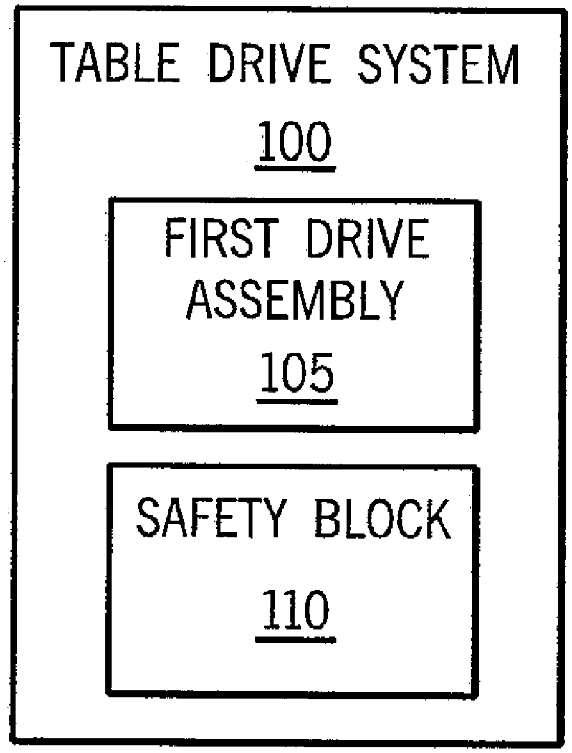
FIG. 1 shows a block diagram of a table drive system in an embodiment of the invention.

FIG. 1 shows a block diagram of an example of a table drive system 100. The table drive system 100 is configured to drive a support table (not shown), the support table (not shown) being configured for engaging and supporting an object (not shown). The object refers to an article, a person or an animal. The support table (not shown) is capable of being displaced to multiple positions along one or more of a longitudinal axis, a lateral axis and a vertical axis, thereby varying the positions of the object (not shown). In the example of the object (not shown) being a patient, the table drive system 100 is used to position the patient as he or she undergoes a medical procedure, such as a medical imaging examination by X-ray, CT, MRI, ultrasound or other imaging modality.

In one embodiment, shown at FIG. 1, the table drive system 100 comprises a first drive assembly 105 and a safety block 110 in combination with the first drive assembly 105, the safety block 110 being configured as discussed in detail below to arrest the motion of the first drive assembly 105 upon experiencing a predetermined condition such as failure of one or more components of the first drive assembly 105.

Figure 2:
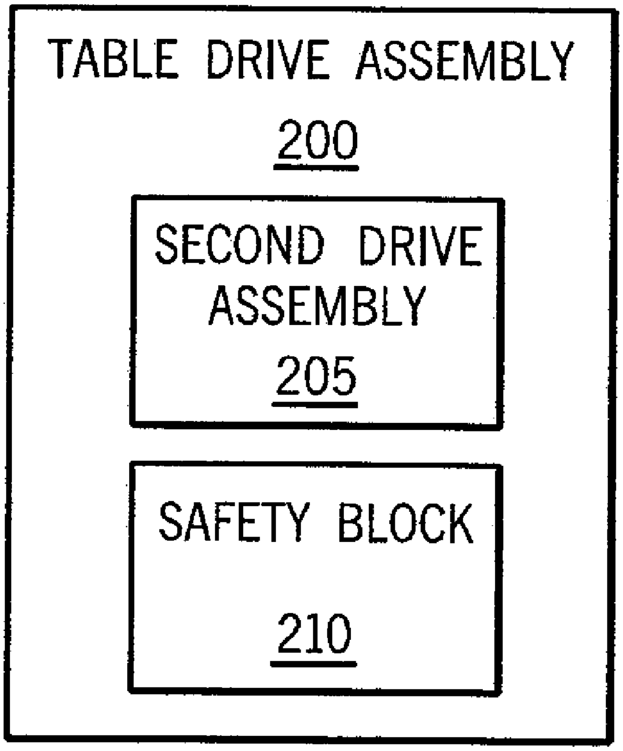
FIG. 2 shows a block diagram of a table drive system in another embodiment of the invention.

In another embodiment, shown at FIG. 2, the table drive system 200 comprises a second drive assembly 205 and a safety block 210 in combination with the second drive assembly 205, the safety block 210 being configured as discussed in detail below to arrest the motion of the second drive assembly 205 upon experiencing a predetermined condition such as failure of one or more components of the second drive assembly 205.

Skilled artisans shall however appreciate that each of the table drive system 100 and 200 can comprise at least one of the first drive assembly 105 (shown at FIG. 1) or the second drive assembly 205 (shown at FIG. 2) or a combination thereof. The first drive assembly 105 can be configured for moving the support table (not shown) in a first direction for example, a longitudinal direction and the second drive assembly 205 can be configured for moving the support table (not shown) in a second direction for example, a vertical direction. In other embodiments, the drive assembly 100 or 200 could be configured for moving the support table (not shown) in a lateral or any other direction.

The first drive assembly 105 and the second drive assembly 205 can be mounted on a common mounting member using a fixture such as, a support bracket screwed, bolted, welded or otherwise fastened on to the mounting member. The mounting member can be a longitudinal plate for example.

FIGS. 3 and 4 shows a block diagram and a schematic diagram of the first drive assembly 105. The first drive assembly 105 includes a motion-inducing member 305, for example a drive motor, coupled to the support table (not shown) through a transmission comprising a rack and pinion arrangement.

A rack and pinion drive assembly comprises a pinion 310 engaged with a rack 315 for transmitting the motion from the motion-inducing member 305 to the support table (not shown) for effecting longitudinal and/or lateral movement of the support table (not shown). The table drive system 100 further includes a stationary safety block 110 disposed in combination with the first drive assembly 105, the safety block 110 being configured to arrest an uncontrolled motion in the first drive assembly 105. The uncontrolled motion may be a result of a failure of one or more components including the pinion 310 in the first drive assembly 105.

The first drive assembly 105 can be mounted on a mounting member 320 as shown in FIG. 4. The safety block 110 may be located within a slot in the mounting member 320 and can be coupled to the mounting member 320 using a fastener such as a screw or bolt, or using a weld. The safety block 110 comprises an internal groove 405 with a toothed portion for locking the pinion 310 of the first drive assembly 105 when the teeth of the pinion 310 move against the toothed portion of the internal groove 405. The radius of the internal groove 405 is approximately equal to the radius of the pinion 310.

Upon experiencing a failure such as a cut in the pinion 310, the pinion 310 is divided into two separate portions and at least one of the two portions say a first portion of the pinion 310 starts drifting downwards due to gravity. The first portion of the pinion 310 consequently falls into the groove 405 in the safety block 110 and gets locked in the toothed portion of the groove 405 as opposed to a second portion of the pinion 310 that gets locked in a toothed portion of the rack 315. The semi circular profile of the internal groove 405 on the safety block 110 restricts the motion of the pinion 310 and thereby stops the linear motion of the rack 315. Thus, on the final effect, the rack 315 gets locked with the safety block 110 through the first and second portion of the cut pinion 310. Once locked in place, the rack 315 restricts the motion of the support table (not shown) on which the object (not shown) lies. The user may then unlock the first drive assembly 105 by replacing the pinion 310 in a controlled manner to correct the failure without injury or damage.

In one embodiment, the toothed portion of the pinion 310 occupies approximately half the circumference of the groove 405 although this may be varied depending on the tooth pattern and spacing in the toothed portion of the groove 405. That is, a number of teeth and a tooth depth sufficient to hold the pinion 310 against the force applied by the drive motor is to be provided.

Skilled artisans shall however appreciate that the safety block 110 described in the above embodiment can be used in conjunction with various other applications comprising a rack and pinion drive assembly.

Figure 5:
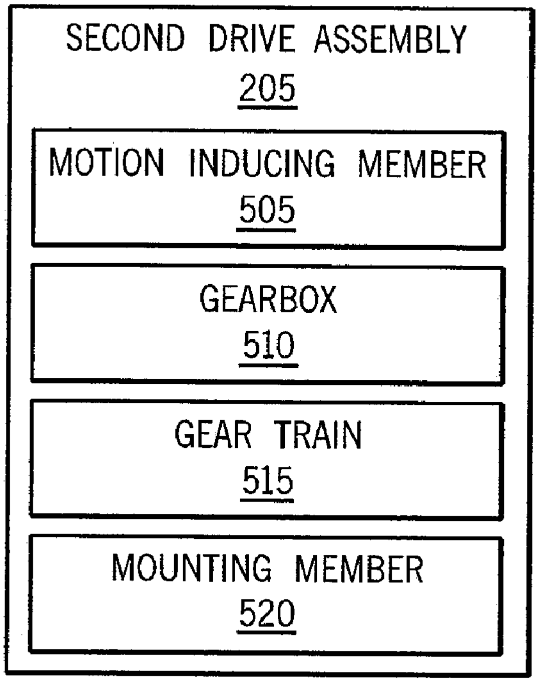
FIG. 5 shows a block diagram of a second drive assembly in an embodiment of the invention.

FIG. 5 shows a block diagram of the second drive assembly 205 configured for moving the support table (not shown) in a second direction for example, along the vertical axis of the support table (not shown).

Accordingly, the second drive assembly 205 (as shown in FIG. 5) comprises a motion-inducing member 505 coupled to a gear train 515 through a transmission apparatus, e.g., a gearbox 510. The gear train 515 can be coupled to the gear box 510 using a fastening device such as a screw or bolt. In an exemplary embodiment, the gearbox 510 can be a non-reversible type comprising a plurality of worm gears for providing a predetermined torque and speed to the support table (not shown). The use of a non-reversible gearbox 510 provides for a better drive orientation and increased compactness to the second drive assembly 205.

The motion-inducing member 505, the gear train 515 and the gearbox 510 are mounted on a mounting member 520. The motion-inducing member 505 may comprise a drive motor with a relatively low torque. The drive motor includes a drive shaft connected to the gear train 515 by the gearbox 510. The gearbox 510 causes the gear train 515 to rotate at a substantially lower speed than the drive shaft and to be capable of exerting substantially higher torque than the drive shaft. This results in the linear translation of the gear train 515 at a slow speed and with a substantially higher force than could be exerted by directly driving the gear train 515 by the drive shaft. The gear train 515 is further explained in conjunction with FIG. 6.

Figure 6:
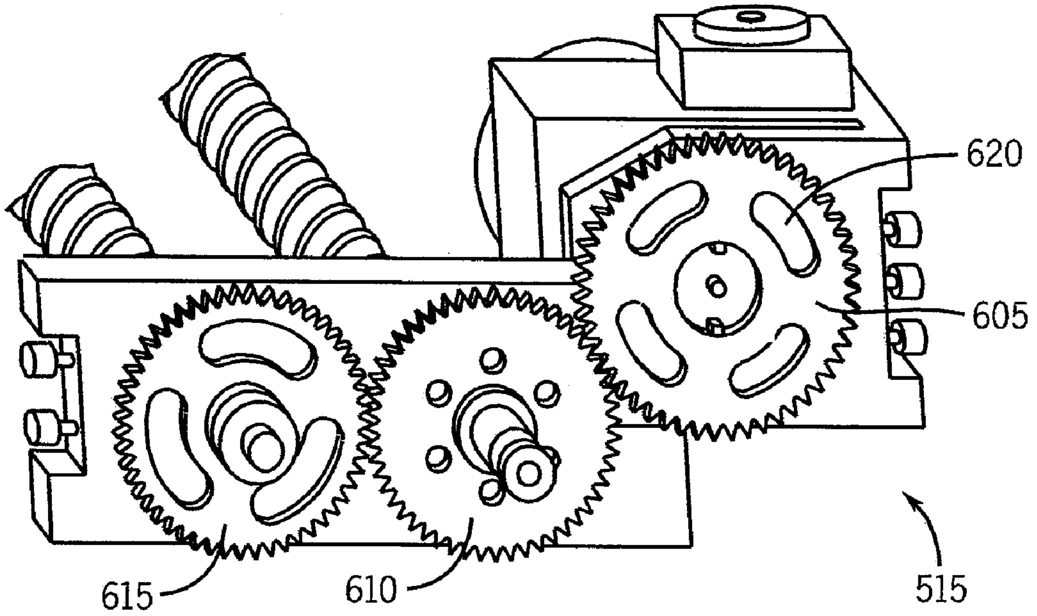
FIG. 6 shows a schematic diagram of a gear train in an embodiment of the invention.

The gear train 515 comprises a plurality of gears. In an exemplary embodiment as shown in FIG. 6, the gear train 515 includes three gears namely, a first gear 605, a second gear 610 and a third gear 615 in driving relationship with one another to multiply the torque from the drive motor while substantially reducing the speed at which the support table (not shown) is driven. The gear train 515 in its assembled form is illustrated in FIG. 6, which more clearly shows the relationship between the individual gears namely, the first gear 605, the second gear 610 and the third gear 615. At least one of the plurality of gears 605, 610 and 615 comprises one or more slots 620. The plurality of slots 620 may not be continuous and can be intermittently spaced with each slot 620 exhibiting a specific circumferential length and depth. The slots 620 function to arrest the rotation of the gears 605, 610 and 615 in certain circumstances, as explained below.

Figure 7:
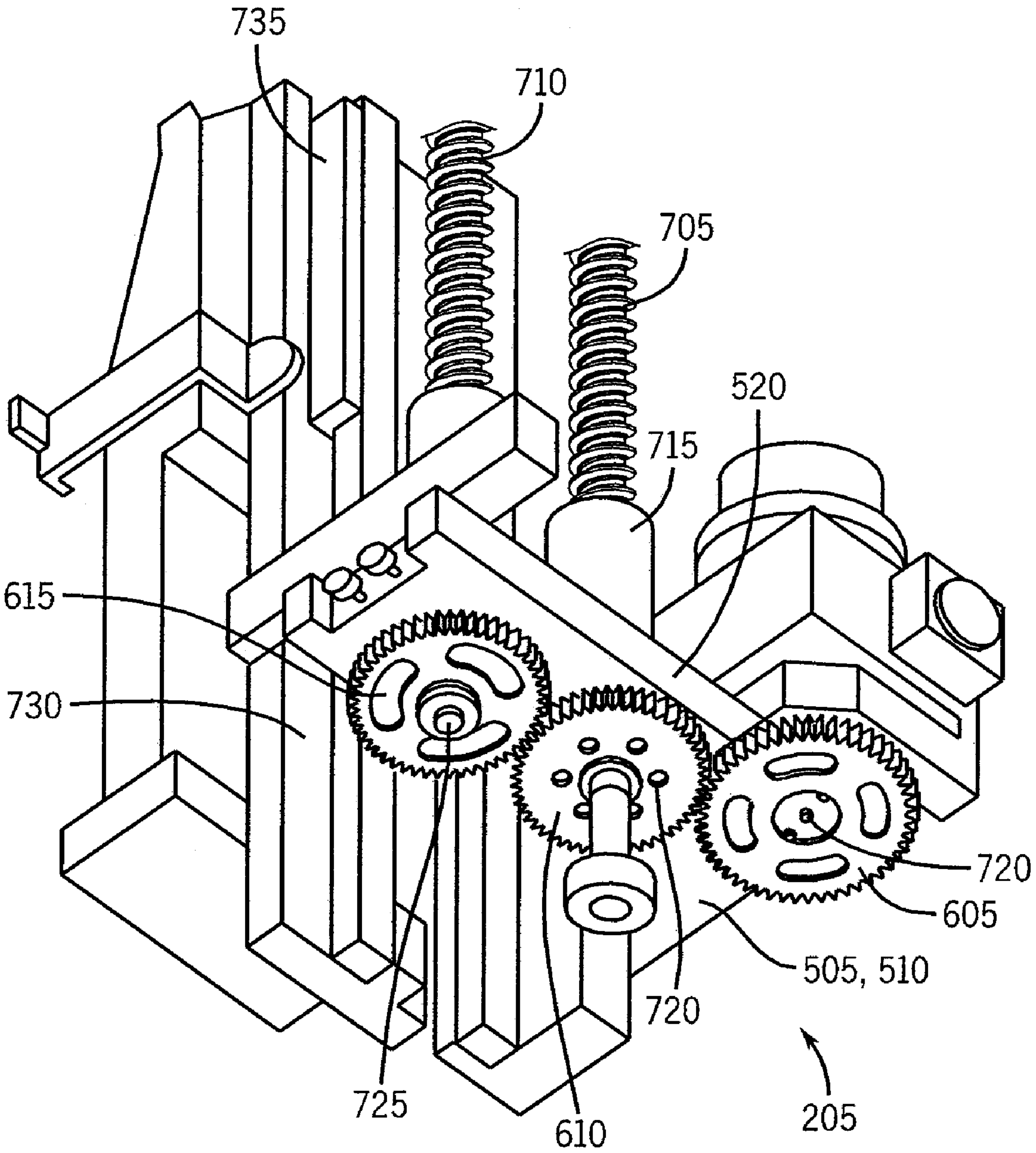
FIG. 7 shows a schematic diagram of a second drive assembly in an embodiment of the invention.

FIG. 7 depicts a schematic diagram of the second drive assembly 205. As shown in FIG. 7, the second drive assembly 205 further comprises a stationary ball screw 705 coupled to the second gear 610 and a rotary ball screw 710 coupled to the third gear 615. The gearbox 510, the stationary ball screw 705 and the rotary ball screw 710 are mounted on the mounting member 520. The stationary ball screw 705 further comprises a rotary nut 715 and the second gear 610 is mounted onto the rotary nut 715 of the stationary ball screw 705 using one or more mounting screws 720. Further, the third gear 615 is coupled to the rotary ball screw 710 and is held in position using a lock nut and a key 725.

The motion of the drive motor is transmitted to the first gear 605 in the gear train 515 using the gearbox 510. The first gear 605 in turn drives the second gear 610. The rotary motion of the second gear 610 is translated into a linear motion by the stationary ball screw 705. As shown in FIG. 7, the second gear 610 meshes with the third gear 615 that rotates the rotary ball screw 710. The rotary ball screw 710 translates motion to a ball screw nut (not shown) fixed to a first stage structure 730. The first stage structure 730 is adapted to move along the vertical axis and is in turn coupled to one or more linear motion guidance blocks 735. The linear motion guidance blocks 735 are coupled the support table (not shown) and are adapted to provide a smooth vertical motion to the support table (not shown). Thus, simultaneous movements of the gears 605, 610 and 615 in the gear train 515 facilitate vertical lift mechanism in the second drive assembly 205.

The schematic diagram of the safety block 210 configured to arrest the motion of the second drive assembly 205 is shown at FIG. 8. In an embodiment, multiple safety blocks 210 may be connected in combination with the second drive assembly 205. This is further explained in conjunction with FIG. 9. Each of the plurality of safety blocks 210 may be configured to arrest the motion of one or more gears 605, 610 and 615 of the gear train 515. The safety blocks 210 can be mounted on either side of the mounting member 520 in such a way as to cover the diameter of the each of the plurality of gears 605, 610 and 615 in the gear train 515. Each safety block 210 comprises one or more projections 805. The projections 805 can be circular in shape with a predetermined length and a predetermined diameter mounted with a specific Pitch Circle Diameter (PCD). Skilled artisans shall however appreciate that the shape of the projections 805 is not limited to circular.

The slots 620 provided on the face of the gears 605, 610 and 615 of the gear train 515 comprise same PCD at which the projections 805 are mounted on the safety blocks 210. The width of the slots 620 is greater than the diameter of the projections 805. The slots 620 in each gear 605, 610 and 615 of the gear train 515 face the projections 805 and are adapted to accommodate the projections 805. Each projection 805 is located at a predetermined distance from a first end of the slot 620 in an unlocked position and abuts against a second end of the slot 620 in a locked position.

Upon experiencing a failure of the drive shaft, the first gear 605 of the gear train 515 drifts down due to gravity. The thickness of each gear 605, 610 and 615 is substantially larger than the distance between each gear 605, 610 and 615 and the safety block 210. Therefore, the three gears 605, 610 and 615 remain operatively coupled to each other upon experiencing fall of the first gear 605. During the fall, the potential energy accumulated in the first gear 605 is converted into kinetic energy, forcing the first gear 605 to start rotating in the opposite direction. The rotation of the first gear 605 causes simultaneous rotation of the second gear 610 and the third gear 615. Thus, each gear 605, 610 and 615 in the gear train 515 rotates in accordance with the projection 805 in a direction to aid in locking the gear train 515. The projection 805 may be positioned in relation to the slot 620 such that rotation of the gear 605, 610 or 615 at a point of engagement with the locking mechanism is in a direction such that the projection 805 engages the second end of the slot 620. Accordingly, the gear 605, 610 or 615 rotates until the projection 805 contacts the second end of the slot 620. As a result of rotation of the gear 605, 610 or 615, the projection 805 of the safety block 210 mates with the slot 620 of the gear 605, 610 or 615. The gear 605, 610 or 615 when prevented from further rotation locks the rest of the gear train 515 thereby preventing rotation of the rotary ball screw 710. The rotary ball screw 710 when prevented from rotating ceases to actuate the lifting mechanism in the second drive assembly 205.

The operation of the locking mechanism may best be understood through an examination of FIGS. 9 and 10 showing a perspective side view and a front view of the second drive assembly 205. In FIGS. 6 and 7 the locking mechanism is illustrated in its quiescent unlocked position. In the locked position shown at FIG. 9, the rotation of the gear 605, 610 and 615 in the clockwise direction is prevented by the projection 805, which has contacted the second end of slot 620.

Once the locking mechanism has been engaged, it may be disengaged manually by a user. The manual force may bias the gear 605, 610 and 615 in an anti-clockwise direction until the projection 805 contacts the first end of the slot 620.

It should be noted that the configuration of the second drive assembly 205 increases the compactness of the table drive system 200, enables mounting on to the mounting member 520 in combination with the first drive assembly 105 and also provides a smooth vertical motion to the support table (not shown), without any shock or jerk to the object (not shown). Furthermore, servicing of the support table (not shown) becomes significantly easy, as the first drive assembly 105 and the second drive assembly 205 are accessible from above the mounting member 520, thereby eliminating the need for removing a support surface (not shown), forming a part of the support table (not shown), for servicing.

FIG. 11 shows a block diagram of a drive system 1100 for a patient positioning system (not shown) as described in one embodiment. The drive system 1100 comprises at least one driving member 1105 configured for moving a patient support table (not shown), and a safety block 1110 in combination with the at least one driving member 1105, the safety block 1110 being configured to arrest the motion of the driving member 1105 upon experiencing a predetermined condition.

In one embodiment, the driving member 1105 comprises at least one of a rack and pinion drive assembly 105 and a gear train drive assembly 205. Accordingly, the predetermined condition comprises failure of at least one of the rack and pinion drive assembly 105 and the gear train drive assembly 205.

Figure 12:
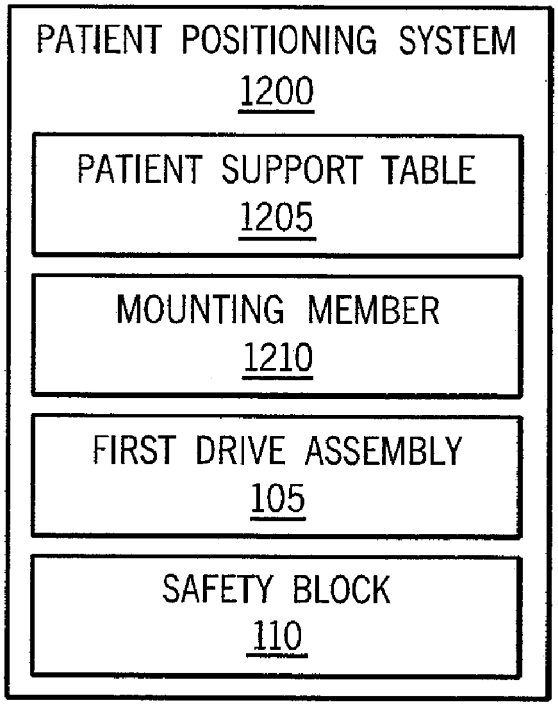
FIG. 12 shows a block diagram of a patient positioning system in an embodiment of the invention.

FIG. 12 shows a block diagram of a patient positioning system 1200 provided in yet another embodiment. The patient positioning system 1200 comprises a patient support table 1205 and a mounting member 1210 coupled to the patient support table 1205. The mounting member 1210 is configured to support at least one of the first drive assembly 105 adapted for moving the patient support table 1205 in a first direction for example a longitudinal direction, and the second drive assembly 205 adapted for moving the patient support table 1205 in a second direction for example a vertical direction.

In one embodiment, as shown in FIG. 12 the patient positioning system 1200 comprises the first drive assembly 105 and the safety block 110 in combination with the first drive assembly 105, the safety block 110 being configured to arrest the motion of the first drive assembly 105 upon experiencing a predetermined condition such as failure of one or more components of the first drive assembly 105.

Figure 13:
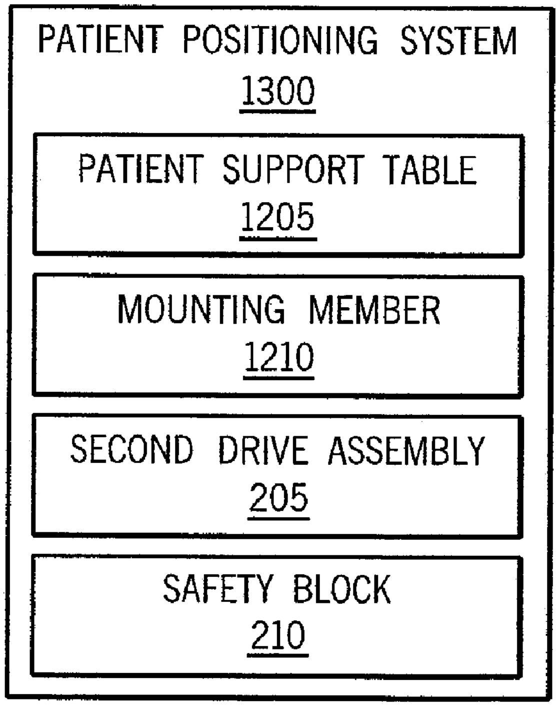
FIG. 13 shows a block diagram of a patient positioning system in another embodiment of the invention.

In another embodiment, shown at FIG. 13, the patient positioning system 1300 comprises the second drive assembly 205 and the safety block 210 in combination with the second drive assembly 205, the safety block 210 being configured to arrest the motion of the second drive assembly 205 upon experiencing a predetermined condition such as failure of one or more components of the second drive assembly 205.

Skilled artisans shall however appreciate that the patient positioning system 1200 shown at FIG. 12 can include the second drive assembly 205 in combination with the safety block 210 and the patient positioning system 1300 shown at FIG. 13 can include the first drive assembly 105 in combination with the safety block 110.

Thus, various embodiments of this invention provide a table drive system 100. Further embodiments of this invention provide a patient positioning system 1200 comprising one or more drive assemblies 105 and 205 configured to provide a compact structure, smooth drive, easy access and increased safety to patients.

Some of the advantages of the table drive system 100 provided in various embodiments of the invention are listed below.

The table drive system 100 provides a reliable, positive and fail-safe mechanism comprising simple mechanical components such as the safety block 110 and 210 for arresting an uncontrolled motion in the drive assembly 105 and 205 as opposed to use of complex electrical control logic. Thus, the table drive system 100 provided in the invention is simple, less complicated and cost effective as the system 100 employs mechanical elements and does not call for any electrical or software logics.

The table drive system 100 provided in the invention is compact as there is no addition of bulky fail-safe brakes. Moreover, the minimum table height, the longitudinal stroke value, the lateral stroke value and the vertical lift stroke value are not affected.

The table drive system 100 provided in the invention provides an easy access for servicing as the safety blocks 110 and 210 provided with the drive assembly 105 and 205 can be easily removed for servicing various elements.

In various embodiments of the invention, a drive assembly for a patient positioning system and a patient positioning system using a drive assembly are described. The patient positioning system can be a part of a diagnostic medical imaging apparatus such as for example, an X ray apparatus, Magnetic resonance imaging device, vascular device, etc. However, the embodiments are not so limited and may be implemented in connection with different applications such as displacement applications. The application of the invention can be extended to other areas, for example positioning devices. The invention provides a broad concept of arresting the motion of a drive assembly under predetermined condition, which can be adapted in a similar positioning device. The design can be carried further and implemented in various forms and specifications.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A table drive system comprising: at least one of a first drive assembly or a second drive assembly or a combination thereof, the first drive assembly being configured for moving a support table in a first direction and the second drive assembly being configured for moving the support table in a second direction; and a safety block in combination with at least one of the first drive assembly or the second drive assembly, wherein the safety block is configured to arrest the motion of the first drive assembly or the second drive assembly upon experiencing a predetermined condition which causes the first drive assembly or the second drive assembly to move into contact with the safety block due to gravity.

2. The table drive system of claim 1, wherein the predetermined condition comprises failure of at least one of the first drive assembly and the second drive assembly.

3. The table drive system of claim 1, wherein the first direction comprises a longitudinal direction and the second direction comprises a vertical direction.

4. The table drive system of claim 1, wherein the first drive assembly and the second drive assembly are mounted on a mounting member.

5. The table drive system of claim 4, wherein the first drive assembly comprises:

a motion-inducing member;

a pinion movably coupled to the motion-inducing member; and a rack movably coupled to the pinion to translate a rotary motion of the pinion to a linear motion.

6. A table drive system comprising: at least one of a first drive assembly or a second drive assembly or a combination thereof, the first drive assembly being configured for moving a support table in a first direction and the second drive assembly being configured for moving the support table in a second direction; and a safety block in combination with at least one of the first drive assembly or the second drive assembly, wherein the safety block is configured to arrest the motion of the first drive assembly or the second drive assembly upon experiencing a predetermined condition, wherein the first drive assembly and the second drive assembly are mounted on a mounting member, and wherein the first drive assembly comprises a motion-inducing member, a pinion movably coupled to the motion-inducing member, and a rack movably coupled to the pinion to translate a rotary motion of the pinion to a linear motion, and wherein the safety block is coupled to the mounting member and comprises a groove positioned at a predetermined distance from the pinion.

7. The table drive system of claim 6, wherein the safety block is configured to arrest the motion of the pinion by locking the pinion in the groove.

8. The table drive system of claim 5, wherein the motion-inducing member is a drive motor.

9. A table drive system comprising: at least one of a first drive assembly or a second drive assembly or a combination thereof, the first drive assembly being configured for moving a support table in a first direction and the second drive assembly being configured for moving the support table in a second direction; and a safety block in combination with at least one of the first drive assembly or the second drive assembly, wherein the safety block is configured to arrest the motion of the first drive assembly or the second drive assembly upon experiencing a predetermined condition, and wherein the first drive assembly and the second drive assembly are mounted on a mounting member, and wherein the second drive assembly comprises:

a motion-inducing member;

a gearbox coupled to the motion-inducing member; and a gear train coupled to the gearbox, the gear train comprising a plurality of gears, wherein at least one of the plurality of gears comprises at least one slot.

10. The table drive system of claim 9, wherein the safety block is coupled to the mounting member and comprises at least one projection.

11. The table drive system of claim 10, wherein the safety block is configured to arrest the motion of the gear train by locking the at least one projection with the at least one slot of the gear.

12. The table drive system of claim 11, further comprising a plurality of safety blocks wherein each of the plurality of safety blocks is configured to arrest the motion of one or more gears of the gear train.

13. The table drive system of claim 9, wherein the motion-inducing member comprises a drive motor.

14. A drive system for a patient positioning system, the drive system comprising:

at least one driving member configured for moving a patient support table; and a safety block in combination with the at least one driving member wherein the safety block is configured to arrest the motion of the driving member upon experiencing a predetermined condition which causes the at least one driving member to move into contact with the safety block due to gravity.

15. The drive system of claim 14, wherein the driving member comprises a rack and pinion drive assembly.

16. The drive system of claim 15, wherein the predetermined condition comprises failure of the rack and pinion drive assembly.

17. The drive system of claim 14, wherein the driving member comprises a gear train drive assembly.

18. The drive system of claim 17, wherein the predetermined condition comprises failure of the gear train drive assembly.

19. A patient positioning system comprising: a patient support table; a mounting member coupled to the patient support table, the mounting member configured to support at least one of a first drive assembly adapted for moving the patient support table in a first direction, and a second drive assembly adapted for moving the patient support table in a second direction; and a safety block in combination with at least one of the first drive assembly or the second drive assembly, wherein the safety block is configured to arrest the motion of the first drive assembly or the second drive assembly upon experiencing a predetermined condition which causes the first drive assembly or the second drive assembly to move into contact with the safety block due to gravity.

20. The patient positioning system of claim 19, wherein the predetermined condition comprises failure of one of the first drive assembly or the second drive assembly.

21. The patient positioning system of claim 19, wherein the first drive assembly is adapted for moving the patient support table along a longitudinal axis and the second drive assembly is adapted for moving the patient support table along a vertical axis.

* * * * *